United States Patent Office 2,786,543
Patented Mar. 26, 1957

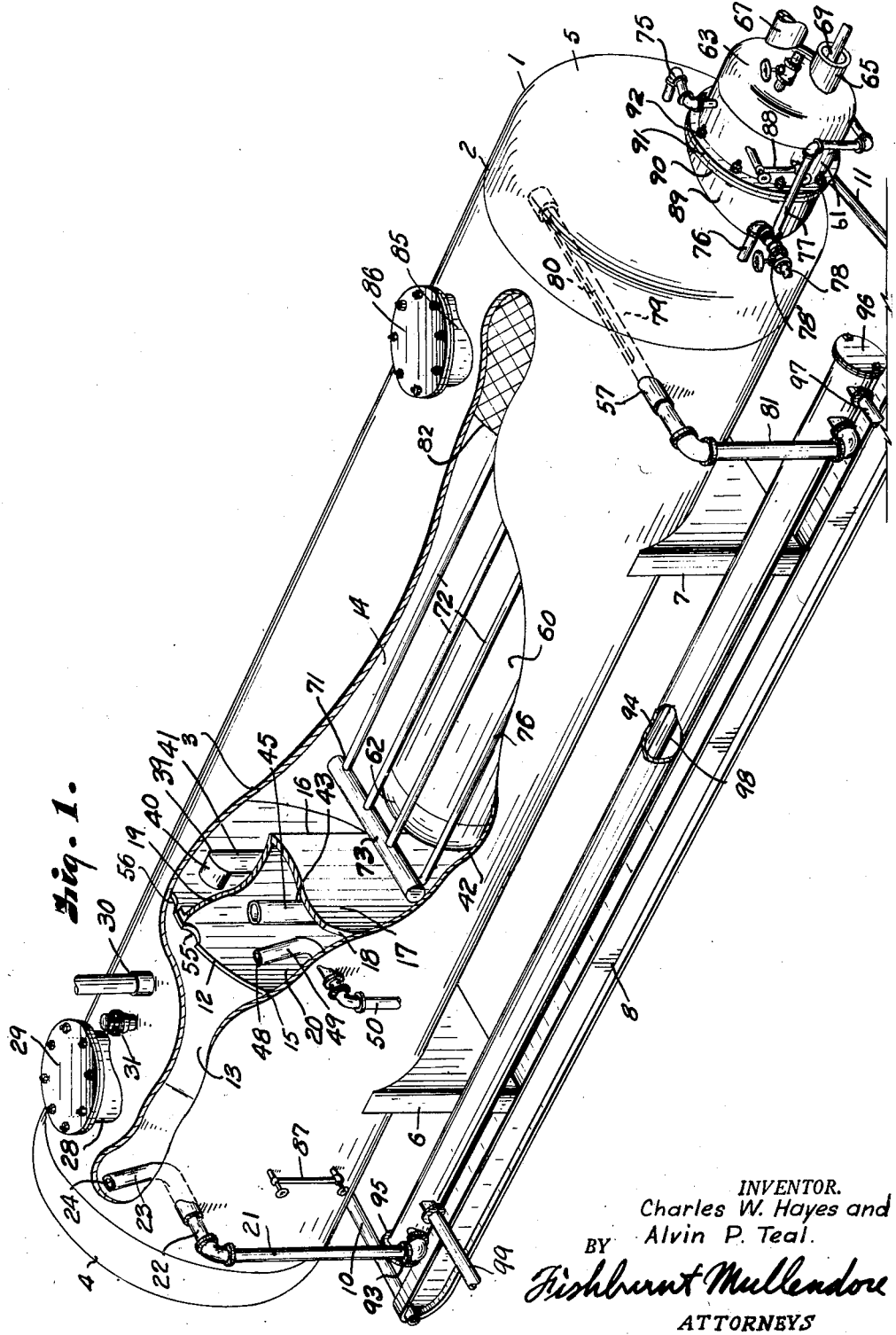

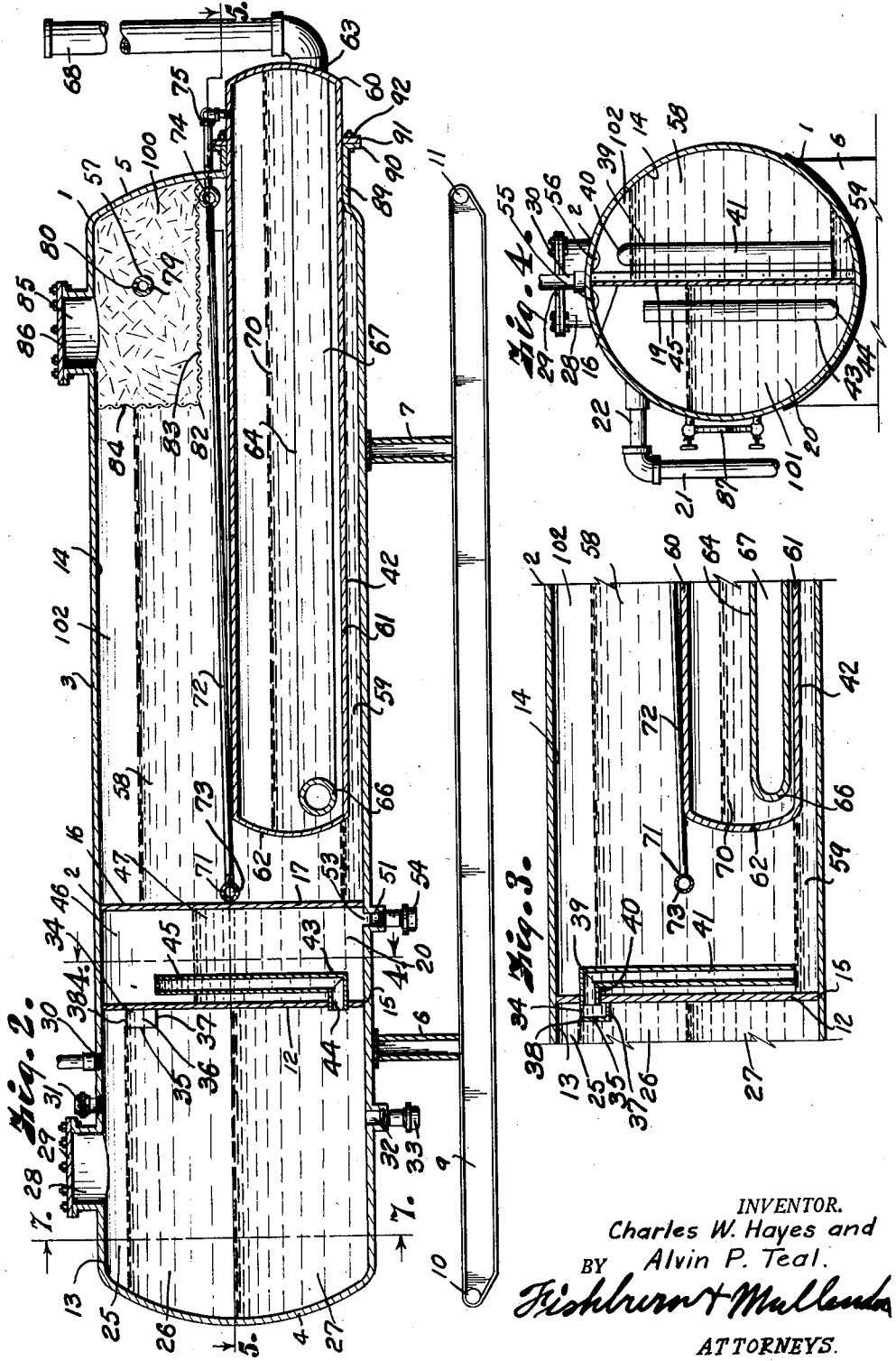

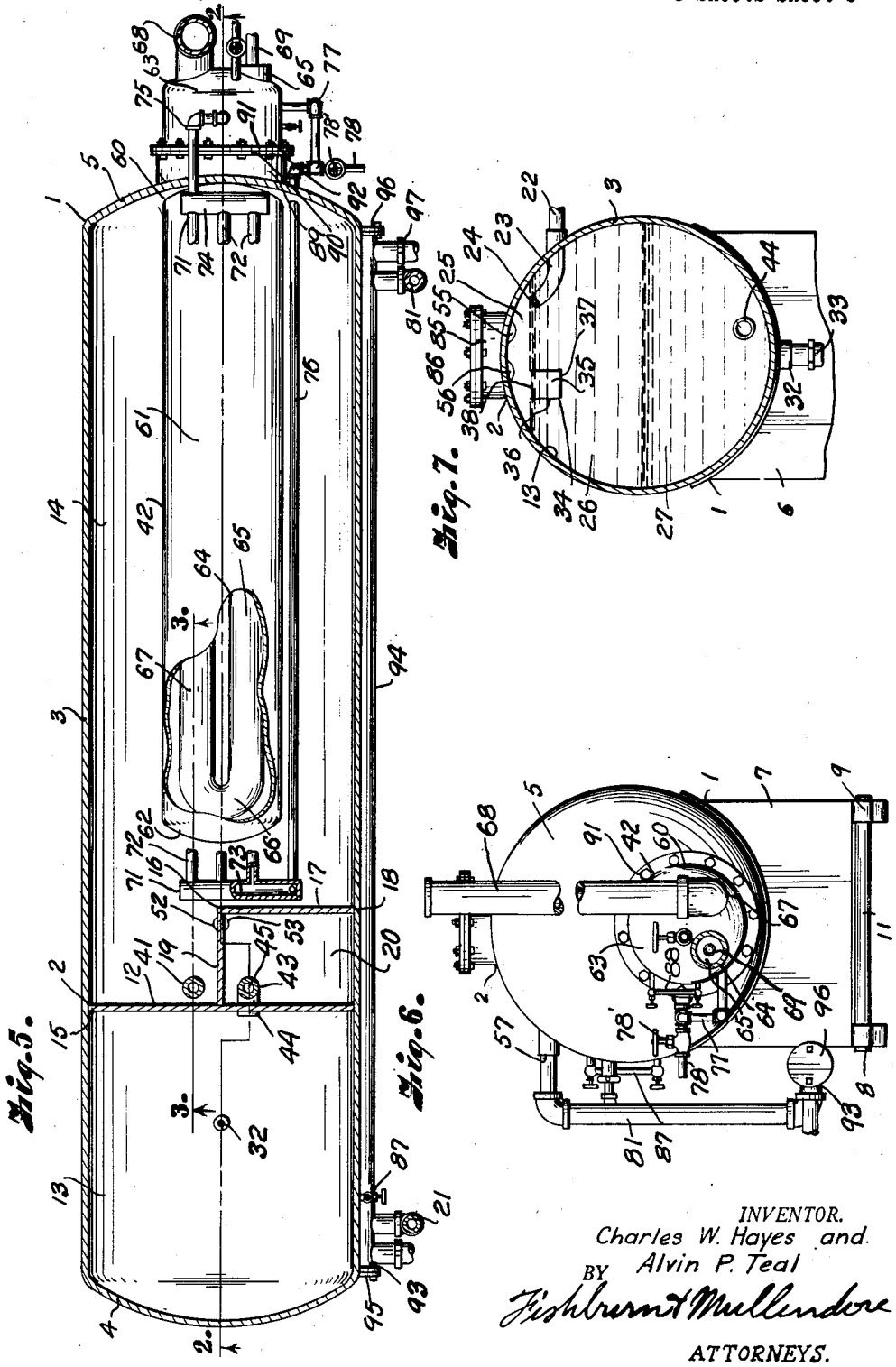

2,786,543

APPARATUS FOR TREATING LIQUID MIXTURES

Charles W. Hayes and Alvin P. Teal, Oklahoma City, Okla., assignors to Black, Sivalls & Bryson, Inc., Kansas City, Mo., a corporation of Delaware Application February 13, 1952, Serial No. 271,366

4 Claims. (Cl. 183—2.7)

This invention relates to an apparatus for treating liquid mixtures such as the flow from a petroleum producing well and which may contain free water, oil, gas and an oil-water emulsion.

Heretofore, the principal process of separating the components of the flow and breaking of the oil-water emulsion involves separation of the free water and gas from the oil and the emulsion, after which the oil and oil-water emulsion were washed in a bath of hot water to assist in breaking up of the emulsion and separation of the oil and water components thereof.

All of these treating steps were carried on by gravity flow of the liquids. Therefore, it was necessary to establish substantially high hydrostatic heads of liquids to give the required time for separation of the liquids and breaking up of the emulsion. Therefore, substantially tall treating vessels were required but for economic reasons and high working pressures limited the diameters thereof. Consequently, a substantially tall and relatively small diameter vessel was required. The form and vertical mounting of such vessels resulted in relatively small innerface areas in the respective treating stages. Excessive turbulation required to effectively separate the gas in such vessels also interfered with separation of the free water from the oil and oil-water emulsion. The fire tubes of the heater were also restricted as to length and area so that direct exposure of the fire tubes of the heater to the water and oil-water emulsion was required to obtain the necessary heat transfer. This resulted in sedimentation and caking of solids on the directly fired surfaces that not only reduced the heating efficiency, but resulted in failure of the heater and presented the hazards of fire and explosions.

The form and shape of the vessel also offered erecting and operating problems, required complicated piping, heavy foundations, and guys to maintain stability of the vessels under high wind pressures.

It is, therefore, the principal object of the present invention to provide a horizontal treater in which the various treating steps may be more efficiently carried on by horizontal flow of the liquids.

Other objects of the invention are to provide a free water knock-out section having ample transverse area to allow rapid settling out of the free water and separation of the gas without the usual turbulence; to provide for removal of the free water without heating thereof; to provide for admission of the flow to be treated above the gas and liquid innerface in the free water and gas separating zone thereby bringing about more rapid separation of the gas and reducing turbulence; to provide a treater wherein the liquid and gas innerfaces are controlled by means of fixed weirs thereby greatly simplifying the operation of the treater; and to provide a treater in which the wash step is eliminated thereby giving greater capacity in the heating section.

It is also an object of the invention to provide the treater with a heating unit which includes a steam generator completely containing the direct fire tubes so that the fluids to be heated do not come in contact with the fire tube surfaces thereby eliminating problems of sedimentation and caking that reduce efficiency and present fire and explosion hazards.

It is also an object of the invention to provide an improved apparatus which includes a sequence of steps for more effectively separating the components of a well flow and breaking up of an emulsion.

A further object of the invention is to provide a treater construction particularly adapted for skid mounting.

In accomplishing these and other objects of the invention hereinafter pointed out, we have provided an improved apparatus illustrated in the accompanying drawings wherein:

Fig. 1 is a perspective view of a treater constructed in accordance with the present invention, parts being broken away to better illustrate the construction and interior arrangement.

Fig. 2 is a vertical longitudinal section through the treater taken on the line 2—2 of Fig. 5.

Fig. 3 is a similar fragmentary section through the treater taken on the line 3—3 of Fig. 5.

Fig. 4 is a cross section taken on the line 4—4 of Fig. 2.

Fig. 5 is a horizontal section through the treater taken on the line 5—5 of Fig. 2.

Fig. 6 is a view of the heater end of the treater.

Fig. 7 is a cross section on the line 7—7 of Fig. 2.

Referring more in detail to the drawings:

1 designates a treater constructed in accordance with the present invention and which includes a horizontally disposed elongated vessel 2 having a cylindrical wall 3 closed at the ends by heads 4 and 5. The vessel is supported on longitudinally spaced bolsters 6 and 7 that are carried on spaced apart runners or skids 8 and 9 which have their ends interconnected by bars 10 and 11. The vessel 2 is preferably welded or otherwise secured to the bolsters, and the bolsters are secured to the skids so as to provide a unitary portable structure which may be readily transported or moved about.

The vessel 2 has a vertical partition 12 extending crosswise of the vessel in spaced relation with the heads 4 and 5 to provide a free water and gas removal knock-out compartment 13 on one side and an oil and oil-water emulsion treating compartment 14 on the other side. The periphery 15 of the partition 12 is suitably joined with the wall 3 as by welding or the like to separate the chambers except through the flow ducts and ports as later described. The partition 12 is located nearer to the head 4 so that the treating chamber 14 is of substantially longer length to give the required spread of the liquids under treatment.

Cooperating with the side of the partition 12 on the side within the compartment 14 is a vertical partition 16 of angular cross section and having a wing 17 of substantially semicircular form that is spaced from the partition 12, and the semicircular edge 18 thereof is welded to the wall of the vessel. The other wing 19 is shown as extending at substantially right angles to the wing 17 in about the vertical diameter of the vessel and is joined with the partition 12 to provide a water receiving and discharging chamber 20 into which water from both compartments 13 and 14 accumulates to maintain the desired heads of liquids within the treater.

The well flow to be treated is admitted to the chamber 13 by way of a duct 21 having a portion 22 which connects to pipe 23 having a discharge end 24 whereby the fluids to be treated may be admitted within the chamber 13 into a gas separating space 25 (Fig. 2). The gas space 25 is maintained above the upper layer of a body of oil and/or oil-water emulsion 26 carried on a layer of separated free water 27. This portion of the vessel may be provided with a manhole 28 that is closed by a pressure-tight cover 29. The upper portion of the water knock-out section is also provided with a gas outlet 30 for the separated gas and with a safety head or pressure fitting 31.

The lower portion of the compartment 13 may be provided with a drain 32 that has a suitable cap or closure, as for example, the cap 33. Fixed within the compartment 13 on the side of the partition 12 is an outlet box 34 having side and end walls 35 and 36 and a bottom 37 with the upper edges 38 of the sides and end walls forming weirs over which the separated oil and oil-water emulsion overflows into the outlet box 34 for discharge into the treating chamber 14 by way of a duct 39. The duct 39 has a lateral neck portion 40 extending from the outlet box 34 through the partition 12. A depending leg portion 41 terminates short of the bottom of the compartment 14 so that the liquids flowing from the box are conveyed to the lower portion of the treating chamber and slightly under the lower portion of a heater 42.

The free water collecting in the lower portion of the compartment 13 is discharged into the chamber 20 through a duct 43. The duct 43 has a lateral inlet 44 extending through the partition 12 and which connects with a riser 45 that extends upwardly within the chamber 20 to discharge within a gas space 46 maintained above the level of water 47 that is contained within the chamber 20. The level of the water is maintained in accordance with the position of an inlet 48 of a swing pipe 49 that extends laterally through the wall of the vessel and connects with a pipe 50 leading to a place of water disposal.

Water may be drained from the compartment 14 and chamber 20 by way of a drain 51 located directly below the wing 19 to connect with both compartments through ports 52 and 53. The drain 51 is normally closed by a cap 54 or other suitable fitting which may be removed when it is desired to drain the respective compartments.

Pressure is equalized and gas flow is established between the compartment 13 and chamber 20 through ports 55 and 56 that are formed in the upper periphery of the partition 12 at the respective sides of the partition wing 19.

The oil and oil-water emulsion on flowing into the compartment 14 accumulates up to a level of a discharge duct 57, later described. The oil collects in an upper layer 58 and the water component of the emulsion collects in a layer 59 in the bottom of the vessel from where it is discharged through the port 52 (Fig. 5) under the wing 19 of the partition 16 and through the port 53 into the water collecting chamber 20.

The heater 42 includes an elongated shell 60 having a cylindrical wall 61 closed at the ends by heads 62 and 63. Mounted within the lower portion of the shell is a fire tube 64 having a leg 65 that extends through the head 63 at one end and the other end terminates short of the inner head 62 in a U bend 66 terminating in a return leg 67 that extends in parallel relation with the leg 65 and extends through the head 63 for connection with a flue or exhaust stack 68. A fuel burner 69 is provided in the outer end of the leg 65 to furnish the heat required for generating hot vapors from a body of heat transfer medium 70 contained within the shell and in which the legs 65 and 67 of the fire tube 64 are immersed.

The capacity of the heater shell may be supplemented by a coil 71 disposed over the top of the heater shell. The coil 71 is shown as comprising a plurality of parallel pipes 72 that are connected at their ends by transverse headers 73 and 74. The header 74 is connected with the top portion of the shell exteriorly of the treater through a pipe 75, and the header 73 is connected with the pipe 76 extending through the head 5 of the treater and having a connection 77 with the heater 42 for returning condensed vapors to the bottom of the heater. The pipe 76 may have a blow off connection 78 that is equipped with a shut off valve 78'.

The clean oil discharge duct 57 comprises a horizontally disposed pipe 79 having a longitudinal slot 80 through which the clean oil from the compartment 14 flows. The pipe 79 extends laterally through the wall of the vessel to connect with a pipe 81 leading to a suitable clean oil storage (not shown).

In order to assure complete removal of water from the clean oil, the oil is caused to pass through a filter 82 that is carried within the upper end portion of the vessel in surrounding relation with the slotted discharge pipe 79 by a foraminated partition having a horizontal portion 83 supporting the filter above the heater and a vertical portion 84 that extends transversely of the vessel as best shown in Fig. 2. A manhole 85 is provided through which the filtering medium may be inserted and removed, the manhole being provided with a cover 86.

The vessel may be provided with various fittings such as a sight gauge 87 to determine the innerface level of the liquids in the water knock-out compartment 13. The end of the heater which projects from the vessel may also be provided with a sight gauge 88 by which the level in the heater shell may be determined.

The heater may be removed as a unit from the vessel for replacement and repair by providing the head 5 of the vessel with a collar 89 of sufficient diameter to admit the shell of the heater. The shell of the heater has a circumferential flange 91 that is fixed to a similar flange 90 of the collar 89 by fastening devices such as bolts 92. Thus when the pipe connection of the coil 71 is discon nected from the heater shell and when the bolts 92 are removed, the entire heater assembly may be removed from the vessel for repair or replacement by a new unit.

In order to cool the clean oil and to preheat the incoming liquids, the treater is preferably provided with a heat exchanger 93 that is mounted alongside the bolsters 6 and 7 as best shown in Fig. 1. The heat exchanger includes an elongated outer shell 94 having closed ends 95 and 96. The hot clean oil is admitted to the shell of the heat exchanger through the pipe 81 at one end thereof, and the clean oil after passing the length of the shell is discharged through a pipe 99 which is a continuation of the pipe 81 and through which the clean oil is conducted to storage.

The cold well fluid is admitted through a pipe 97 to heat exchange tubes 98 that are contained within the shell and is discharged from the tubes 98 through the pipe 22 into the treater.

In describing the operation, it is assumed that the shell 60 of the heater 42 contains a heat transfer liquid 70 and that the burner 69 is in operation. It is also assumed that the pipe 97 is connected with a source of fluid production, for example, with a petroleum oil and gas producing well wherein the flow contains free water and oil-water emulsion. It is also assumed that the pipe 99 is connected with a clean oil storage and that the pipe 50 is connected with a place of water disposal. Also, the compartments formed by the foraminated partition 82 have been filled with a filtering medium 100 through the manhole 85.

The well flow being admitted through the pipe 97 passes to the preheater and flows through the inner tube 98 in heat exchange relation with the treated clean liquid contained within the shell 94. After the treater has been in operation, the hot treated oil flowing through the shell 94 is cooled by giving up its heat to the cooler flow of well fluids. The preheated fluids leave the heat exchanger through the pipe 21 and are discharged through the pipe 23 into the gas space 25 of the water knock-out and gas separating compartment 13.

The free water contained in the flow collects in a layer in the compartment 13 as indicated at 27, and the oil-water emulsion, being lighter, collects in a layer 26 while the gas which separates collects in the space 25 and is discharged through the pipe 30. When the surface level of the oil and oil-water emulsion rises to the weirs 38, the oil and oil-water emulsion flows into the weir box 34 from where the liquids discharge into the treating compartment 14 through the duct 39, the liquids being discharged near the level of the bottom of the heater 42 so that the liquids flow under and along the length of the heater. The separated free water 27 flows into the duct 43 and moves upwardly within the riser 45 for discharge into the chamber 20 and in which a body of water 47 accumulates up to the inlet 48 of the swing pipe 49. The separated water then begins to flow through the swing pipe and is carried away through the pipe 50. Pressure is equalized between the chamber 20 and compartment 13 by way of the port 55 in the partition 12 so that the hydrostatic level of water in the riser pipe 45 is substantially balanced with the hydrostatic head of the liquids in the water knock-out compartment.

In the heating and settling section, the oil and oil-water emulsion are heated to the desired temperature. The water component separates from the oil and flows to the bottom of the treating and settling compartment where it discharges into the water collecting chamber 20 by way of the ports 52 and 53. The hot oil and oil resulting from breaking the emulsion collect in the treating compartment as indicated at 58 with the level rising to the level of the outlet slot 80 in the discharge duct 57.

On flowing from the compartment 14, the oil passes through the filter section as it skims off through the slot 80. The gas produced by heating of the emulsion passes up through the oil and into the gas space 102 above the oil 58. The hot distilled vapors then pass through the port 56 and into the gas space in the free water knock-out compartment 13 where it mixes with the cool separated gas so that the heavier fractions of the gas are condensed out and drop into the liquid flowing into the weir box. The condensates are thus recovered to maintain a high gravity of the oil discharged from the treater.

The heater is an important part of the present invention and efficiently heats the oil without the usual heating difficulties. The fire tube 64 generates steam within the shell 61 up to 15 p. s. i. working pressure. This steam condenses upon the working surface of the steam generator shell and its heat of vaporization is transferred to the oil flowing around the outer surface of the shell. The oil and oil-water emulsion is thus directly heated instead of being passed through a body of hot wash water as has been the previous practice.

The capacity of the heater is supplemented by the coil 71, and this unit will provide additional steam for other purposes as for example, preheating the well stream or for uses around the lease site on which the treater is installed.

It is thus obvious that the emulsion is heated by circulating it in direct contact with a vapor heated surface surrounding a vapor generating zone and that the fuel is directly fired in the vaporizing zone to produce the hot vapors for direct contact with said surface to heat the emulsion responsive to the heat of vaporization of the directly heated liquid in which the firing tube is immersed.

By thus heating the emulsion and oil, sedimentation and caking on the surface of the fire tube is eliminated. Thus the unit is far safer, and the danger involved in fire tube failure does not exist.

If for any reason it becomes necessary to drain the treater, the compartments 13 and 14 may be emptied independently of each other upon removal of the drain caps 33 or 54. The liquids contained in the compartment 13 drain through the outlet 32 while the liquids in the compartment 14 drain through the port 52 and drain outlet 51. Simultaneously, the water collecting in the chamber 20 discharges through the drain by way of the port 53.

Another feature is that the primary gas separation is made cold to avoid loss of the more readily condensible vapors. The gas which is evolved in the heating is also saved because it mixes with the cold gas in the gas space 25 wherein the heavier gas fractions, being cooled, condense and are recovered in the oil and oil-water emulsion 26. Thus the gravity of the oil product is maintained at a high value.

Since the treater is horizontal and mounted on skids, there is no problem of complicated foundations or erection problems as in the case of the vertical treater. The treater, on being skid mounted, is readily portable and may be moved about from one lease site to another. The horizontal arrangement gives a free water knock-out section that is ample to allow rapid settling of the free water, and the horizontal flow offers a larger surface for the separation of free water and gas.

Attention is also directed to the fact that the free water is discharged from the treater without heating. Heating the oil directly instead of using the usual water bath gives the capacity and heating and settling action time necessary for the oil and emulsified water to separate. Practically all of the heat and settling section is used for processing the oil. This reduces the heat load on the heater and increases the efficiency of the treater.

A heater of the steam generator type is also efficient and safe in operation, and by not having the hot surface of the fire tube in contact with the oil, the heating unit remains free from sedimentation and caking trouble. The heater is also readily removed for inspection, repair or replacement of the unit.

Another feature is that the relatively large filter bed in the treater aids in the final separation of the water and the oil before the oil passes from the treater.

From the foregoing, it is obvious that we have provided a treater which is of simple and relatively inexpensive construction but which is adapted to operate with maximum efficiency.

What we claim and desire to secure by Letters Patent is:

1. A combined separator and treater for a fluid mixture containing gas, free water and an oil-water emulsion, said separator and treater including, an elongated horizontal vessel, means dividing the vessel into a gas and free water and emulsion separating compartment, a free water collecting compartment, and an emulsion treating compartment, all entirely contained within said vessel; a substantially elongated indirect heater extending lengthwise within the lower portion of the treating compartment and containing a heat transfer medium; means for admitting said mixture to the upper portion of the separating compartment; a duct having an inlet in connection with the upper portion of the separating compartment and below a gas space to be maintained along the length of the vessel and having an outlet into the lower portion of the treating compartment to conduct separated emulsion into the treating compartment for flow in the endwise direction of said heater and along the length thereof; an oil outlet connection with the upper portion of the treating compartment remote from said duct outlet and below the gas space to maintain substantially balanced hydrostatic heads of liquid in the separating and treating compartments and for establishing a relatively low velocity flow of the emulsion along the length of said heater to give ample time for the indirect heating of the emulsion and effect breaking the emulsion for gravity separation of the oil and water components of the emulsion with the oil collecting in a substantially quiescent body on the top of the emulsion while the water collects in a shallow body in the bottom of the treating compartment, said bottom portion of the treating compartment having connection with the bottom of the water collecting compartment for flow of the water into said water collecting compartment, and a water discharge duct having an inlet in connection with the water collecting compartment and cooperating with the oil outlet connection in maintaining the shallow body of water below the heater.

2. A combined separator and treater as described in claim 1 and means forming a filtering chamber above the heater and enclosing the oil outlet connection for filtering the heated oil.

3. A combined separator and treater for a fluid mixture containing gas, free water and an oil-water emulsion, said separator and treater including, an elongated horizontal vessel, means dividing the vessel into a gas and free water and emulsion separating compartment, a free water collecting compartment, and an emulsion treating compartment, all entirely contained within said vessel; a substantially elongated indirect heater extending lengthwise within the lower portion of the treating compartment and containing a heat transfer medium; a heating element above the indirect heater having connections with the heater for circulating said heat transfer medium therein; means for admitting said mixture to the upper portion of the separating compartment; a duct having an inlet in connection with the upper portion of the separating compartment and below a gas space to be maintained along the length of the vessel and having an outlet into the lower portion of the treating compartment to conduct separated emulsion into the treating compartment for flow in the endwise direction of said heater and along the length thereof; an oil outlet connection with the upper portion of the treating compartment remote from said duct outlet and below the gas space to maintain substantially balanced hydrostatic heads of liquid in the separating and treating compartments and for establishing a relatively low velocity flow of the emulsion along the length of said heater to give ample time for the indirect heating of the emulsion and effect breaking the emulsion for gravity separation of the oil and water components of the emulsion with the oil collecting in a substantially quiescent body on the top of the emulsion and in the heat zone of the heating element while the water collects in a shallow body in the bottom of the treating compartment, said bottom portion of the treating compartment having connection with the bottom of the water collecting compartment for flow of the water into said water collecting compartment, and a water discharge duct having an inlet in connection with the water collecting compartment and cooperating with the oil outlet connection in maintaining the shallow body of water below the heater and the separated oil within the heat zone of the heating element.

4. A combination separator and treater as described in claim 3 and a filter compartment above the heating element and surrounding the oil outlet connection.

References Cited in the file of this patent
UNITED STATES PATENTS

| | | |
|---|---|---|
| 1,981,310 | Currie | Nov. 20, 1934 |
| 2,179,131 | Millard | Nov. 7, 1939 |
| 2,474,475 | Glasgow | June 28, 1949 |
| 2,522,429 | Buchan | Sept. 12, 1950 |
| 2,528,032 | Candler et al. | Oct. 31, 1950 |
| 2,546,269 | Lovelady | Mar. 27, 1951 |
| 2,579,184 | Glasgow et al. | Dec. 8, 1951 |
| 2,582,134 | Kimmel et al. | Jan. 8, 1952 |
| 2,601,904 | Erwin | July 1, 1952 |
| 2,656,006 | Wilson | Oct. 20, 1953 |
| 2,656,925 | Johnson | Oct. 27, 1953 |
| 2,706,531 | Lovelady et al. | Apr. 19, 1955 |